United States Patent [19]
Vaughan

[11] Patent Number: 5,716,512
[45] Date of Patent: Feb. 10, 1998

[54] METHOD FOR MANUFACTURING SALTS OF METALS

[76] Inventor: Daniel J. Vaughan, P.O. Box 258, Rockland, Del. 19732-0258

[21] Appl. No.: 438,249

[22] Filed: May 10, 1995

[51] Int. Cl.$^6$ .......................................... C25B 1/14
[52] U.S. Cl. .................. 205/488; 205/477; 205/478; 205/494; 205/498
[58] Field of Search .................... 205/477, 488, 205/478, 494, 498; 204/520, 522, 529

[56] References Cited

U.S. PATENT DOCUMENTS

| | | | |
|---|---|---|---|
| 4,995,956 | 2/1991 | Mani | 205/522 |
| 5,255,052 | 10/1993 | Takikawa | 205/488 |
| 5,522,972 | 6/1996 | Nobel | 205/488 |

FOREIGN PATENT DOCUMENTS 63-303078  12/1988  Japan.

*Primary Examiner*—John Niebling
*Assistant Examiner*—Brendan Mee

[57] ABSTRACT

Process and equipment for manufacturing salts of metals, particularly nickel hypophosphite, are disclosed.

9 Claims, 10 Drawing Sheets

A1 INSOLUBLE ANODE
A2 METAL ANODE
C1 ANOLYTE COMPARTMENT
C2 FIRST ELECTROLYTE COMPARTMENT
C3 CATHOLYTE COMPARTMENT
M$^{++}$ METAL CATIONS
H$^+$ HYDROGEN ION
H$_2$PO$_2^-$ HYPOPHOSPHITE ANION
OH$^-$ HYDROXIDE ION
Na$^+$ SODIUM ION
AM ANION PERMEABLE MEMBRANE
CM CATION PERMEABLE MEMBRANE

A1 INSOLUBLE ANODE
A2 METAL ANODE
C1 ANOLYTE COMPARTMENT
C2 FIRST ELECTROLYTE COMPARTMENT
C3 CATHOLYTE COMPARTMENT
$M^{++}$ METAL CATIONS
$H^+$ HYDROGEN ION
$H_2PO_2^-$ HYPOPHOSPHITE ANION
$OH^-$ HYDROXIDE ION
$Na^+$ SODIUM ION
AM ANION PERMEABLE MEMBRANE
CM CATION PERMEABLE MEMBRANE

A1 INSOLUBLE ANODE
A2 METAL ANODE
C1 ANOLYTE COMPARTMENT
C2 FIRST ELECTROLYTE COMPARTMENT
C3 CATHOLYTE COMPARTMENT
C4 SALT FORMING COMPARTMENT
$M^{++}$ METAL CATIONS
$H^+$ HYDROGEN ION
$H_2PO_2^-$ HYPOPHOSPHITE ANION
$OH^-$ HYDROXIDE ION
$Na^+$ SODIUM ION
AM ANION PERMEABLE MEMBRANE
CM CATION PERMEABLE MEMBRANE

A1 INSOLUBLE ANODE
A2 METAL ANODE
CAI ANOLYTE I COMPARTMENT
CAII ANOLYTE II COMPARTMENT
C2 FIRST ELECTROLYTE COMPARTMENT
C3 CATHOLYTE COMPARTMENT
$M^{++}$ METAL CATIONS
$H^+$ HYDROGEN ION
$I^-$ IODINE ION
$OH^-$ HYDROXIDE ION
$Na^+$ SODIUM ION
AM ANION PERMEABLE MEMBRANE
CM CATION PERMEABLE MEMBRANE

A1 INSOLUBLE ANODE
A2 METAL ANODE
A3 INSOLUBLE ANODE
C6 ANOLYTE METAL FORMING ELECTROLYTE
C7 CATHOLYTE 1 - "FIRST ELECTROLYTE"
C8 ANOLYTE CELL 2
C9 CATHOLYTE 2
$M^{++}$ METAL CATIONS
$H^+$ HYDROGEN ION
$H_2PO_2^-$ HYPOPHOSPHITE ANION
$OH^-$ HYDROXIDE ION
$Na^+$ SODIUM ION
AM ANION PERMEABLE MEMBRANE
CM CATION PERMEABLE MEMBRANE

A1 INSOLUBLE ANODE
A2 METAL ANODE
C1 ANOLYTE COMPARTMENT
C2 FIRST ELECTROLYTE COMPARTMENT
C3 CATHOLYTE COMPARTMENT
C4 SALT FORMING COMPARTMENT
$M^{++}$ METAL CATIONS
$H^+$ HYDROGEN ION
$H_2PO_2^-$ HYPOPHOSPHITE ANION
$OH^-$ HYDROXIDE ION
$Na^+$ SODIUM ION
AM ANION PERMEABLE MEMBRANE
CM CATION PERMEABLE MEMBRANE

A1 INSOLUBLE ANODE
A2 METAL ANODE
C1 ANOLYTE COMPARTMENT
C2 FIRST ELECTROLYTE COMPARTMENT
C3 CATHOLYTE COMPARTMENT
C5 REACTOR COMPARTMENT
$M^{++}$ METAL CATIONS
$H^+$ HYDROGEN ION
$H_2PO_2^-$ HYPOPHOSPHITE ANION
$OH^-$ HYDROXIDE ION
$Na^+$ SODIUM ION
AM ANION PERMEABLE MEMBRANE
CM CATION PERMEABLE MEMBRANE

A1 INSOLUBLE ANODE
A2 METAL ANODE
C1 ANOLYTE COMPARTMENT
C2 METAL FORMING ELECTROLYTE (PLATING BATH)
C3 FIRST ELECTROLYTE
C4 CATHOLYTE COMPARTMENT
$M^{++}$ METAL CATIONS
$H^+$ HYDROGEN ION
$H_2PO_2^-$ HYPOPHOSPHITE ANION
$OH^-$ HYDROXIDE ION
$Na^+$ SODIUM ION
AM ANION PERMEABLE MEMBRANE
CM CATION PERMEABLE MEMBRANE

A1 INSOLUBLE ANODE
A2 METAL ANODE
C1 ANOLYTE COMPARTMENT
C2 FIRST ELECTROLYTE COMPARTMENT
C3 CATHOLYTE COMPARTMENT
$M^{++}$ METAL CATIONS
$H^+$ HYDROGEN ION
$H_2PO_2^-$ HYPOPHOSPHITE ANION
$OH^-$ HYDROXIDE ION
$Na^+$ SODIUM ION
AM ANION PERMEABLE MEMBRANE
CM CATION PERMEABLE MEMBRANE

A2  METAL ANODE
C1  ANOLYTE
C2  SALT FORMING ELECTROLYTE
C3  FIRST ELECTROLYTE
C4  REACTOR ELECTROLYTE
C5  CATHOLYTE
AM  ANION PERMEABLE MEMBRANE
CM  CATION PERMEABLE MEMBRANE

METHOD FOR MANUFACTURING SALTS OF METALS

FIELD OF THE INVENTION

This invention relates to an electrochemical process and equipment for preparing metal salts, e.g. nickel hypophosphite.

BACKGROUND OF THE INVENTION

Aqueous solutions of metal salts have found broad use in finishing the surfaces of metals and plastics. Nickel hypophosphite is an especially preferred salt for electroless plating of nickel and alloys of nickel and phosphorous. Nickel hypophosphite can be made by reacting nickel hydroxide or nickel carbonate with hypophosphorous acid. This method, although technically acceptable, yields a salt too high in cost to be competitive with a mixture of nickel sulfate and sodium hypophosphite used for electroless deposition of nickel. This mixture, however, results in a more complex chemistry and relatively low utilization of the plating bath chemicals. In my U.S. Pat. No. 4,636,288, I disclosed a method for electrodialytically converting a salt of a metal cation into the acid of the salt anion and into an insoluble hydroxide of the metal cation. The conversion of sodium hypophosphite to hypophosphorous acid and sodium hydroxide and the conversion of nickel sulfate to sulfuric acid and nickel hydroxide provides a way to make nickel hypophosphite. It would be preferable, however, that the nickel hypophosphite be made in one electrodialytic step. One objective of the instant invention is to provide a method for making nickel hypophosphite and other metal salts using dissolvable metal anodes and alkali salts containing the anion of the metal salt.

The dissolution of metal anodes to form salts is broadly used in the electroplating and surface finishing industries. The salts are mostly formed in undivided electrocells having one electrolyte where the metal anode is dissolved simultaneous with the electroplating of the dissolved metal onto parts serving as cathodes. Electrodialysis, which comprises the transport of ions through ion permeable membranes as a result of an electrical driving force, has also been used The electrodialysis is usually carried out in a cell having two compartments and thus two electrolytes. The compartments can be separated by an anion permeable membrane or a cation permeable membrane. Dissolution, oxidation, of a metal anode occurs in the anolyte and metal cations can be electrotransported through a cation permeable membrane or retained in the anolyte when the cell is separated by an anion permeable membrane. I have found that it is possible to form a metal salt by anodically dissolving a metal in the anolyte of a cell that is separated from an acid catholyte by an anion permeable membrane. However, I have found that the salt solution varies in free acid depending on the relative electrochemical efficiencies of anodically dissolving a metal and the electrotransport of anions through an anion permeable membrane from an acidic catholyte. Attempts to use a solution of an alkali salt as the catholyte were unsuccessful. An insoluble crust of metal hydroxide formed on the anolyte side of the anion membrane. The anion membrane became porous, presumably from chemical degradation and allowed anolyte to enter the catholyte. A precipitate of metal hydroxide formed in the anolyte and the electrochemical process lost capacity and efficiency. The primary objective of the instant invention is to provide a method for making metal salts by anodically dissolving a metal to form the metal cations of the salt and by electrotransporting the anions of the salt through an anion permeable membrane. A further object of this invention is to provide a method for making a metal salt having an anion capable of reducing the metal cation of the salt to a metal, i.e. hypophosphite anions.

SUMMARY OF THE INVENTION

The objects of the invention are accomplished by using an electrochemical cell having at least three compartments; an anolyte, a first electrolyte and a catholyte. The first electrolyte, an aqueous solution of a salt, is separated by an anion permeable membrane from an anolyte and by a cation permeable membrane from a catholyte. Anions of the first electrolyte are electrotransported to the anolyte and cations are electrotransported to the catholyte. The relative cotransport of acid anions of the salt and hydroxide ions from the first electrolyte is controlled by varying the pH of the first electrolyte so that the pH of the liquid interface on the anolyte side of the anion permeable membrane is less than the pH at which the cation of the metal salt in the anolyte would form an insoluble hydroxide. Water is electrolyzed in the anolyte to adjust for the transport of hydroxide ions and also to adjust the imbalance of electrical efficiencies of the anodic oxidation and dissolution of the metal anode to form metal cations and the electrotransport of acid anions from the first electrolyte to the anolyte. I have found that by controlling the pH of the first electrolyte and by controlled electrolysis of water in the anolyte it is possible to make solutions of salts efficiently and at high capacity by anodic dissolution of a metal and the transport of anions from an aqueous solution of an alkali salt in an electrodialytic cell having at least an anolyte or salt-forming electrolyte separated by an anion permeable membrane from a first electrolyte.

Specifically, this invention relates to an electrodialytic process for making salts of metals by anodic dissolution of a metal and the electrotransport of an anion of an alkali salt through an anion permeable membrane into an electrolyte containing metal cations. The process of this invention is preferably carried out in an electrochemical cell having at least an anolyte, a first electrolyte and a catholyte with the first electrolyte being separated by an anion permeable membrane from the anolyte and by a cation permeable membrane from the catholyte where: (1) metal is oxidized and dissolved as metal cations in the anolyte and formed into a salt by anions electrotransported from the first electrolyte into the anolyte through the anion permeable membrane; (2) simultaneously the metal cations of the first electrolyte are transported to the catholyte through the cation permeable membrane; (3) the pH of the first electrolyte is adjusted and maintained to limit the transport of hydroxide ions from the first electrolyte to the anolyte so that the pH of the anolyte at the interface of the anion permeable membrane is less than the pH at which the metal cations form a crust on the membrane or form solids in the anolyte; (4) water is electrolyzed in the anolyte to form hydrogen ions and to increase the transport of anions from the first electrolyte to maintain the acidity of the anolyte to prevent precipitation of metal hydroxides and facilitate efficiency and capacity of the anodic process; (5) cations of the first electrolyte are electrotransported to the catholyte through the cation permeable membrane and converted preferably to a hydroxide. Cations, also, are removed separately from the first electrolyte to maintain pH of the first electrolyte.

The process of this invention is broadly applicable for conversion of metals to salts with anions of the salts being provided by an alkali salt.

This invention will be more clearly understood by referring to the drawing and the detailed description that follows:

BRIEF DESCRIPTION OF THE DRAWINGS

FIG. I, FIG. II, FIG. III, FIG. IV, FIG. V, FIG. VI, FIG. VII, FIG. VIII, FIG. IX and FIG. X are schematic representations of the invented process and the equipment used in the operation of the invention.

DETAILED DESCRIPTION OF THE INVENTION

Figure 1:
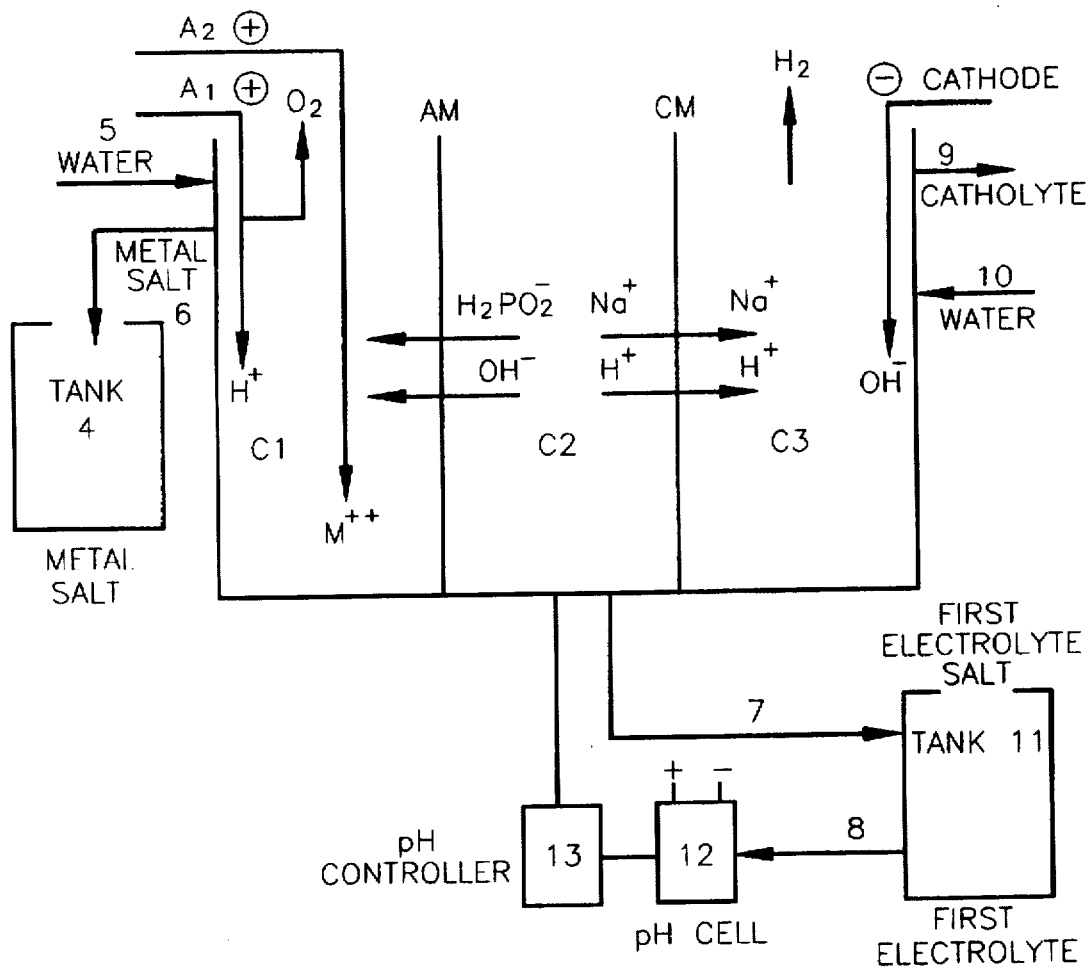
Figure 2:
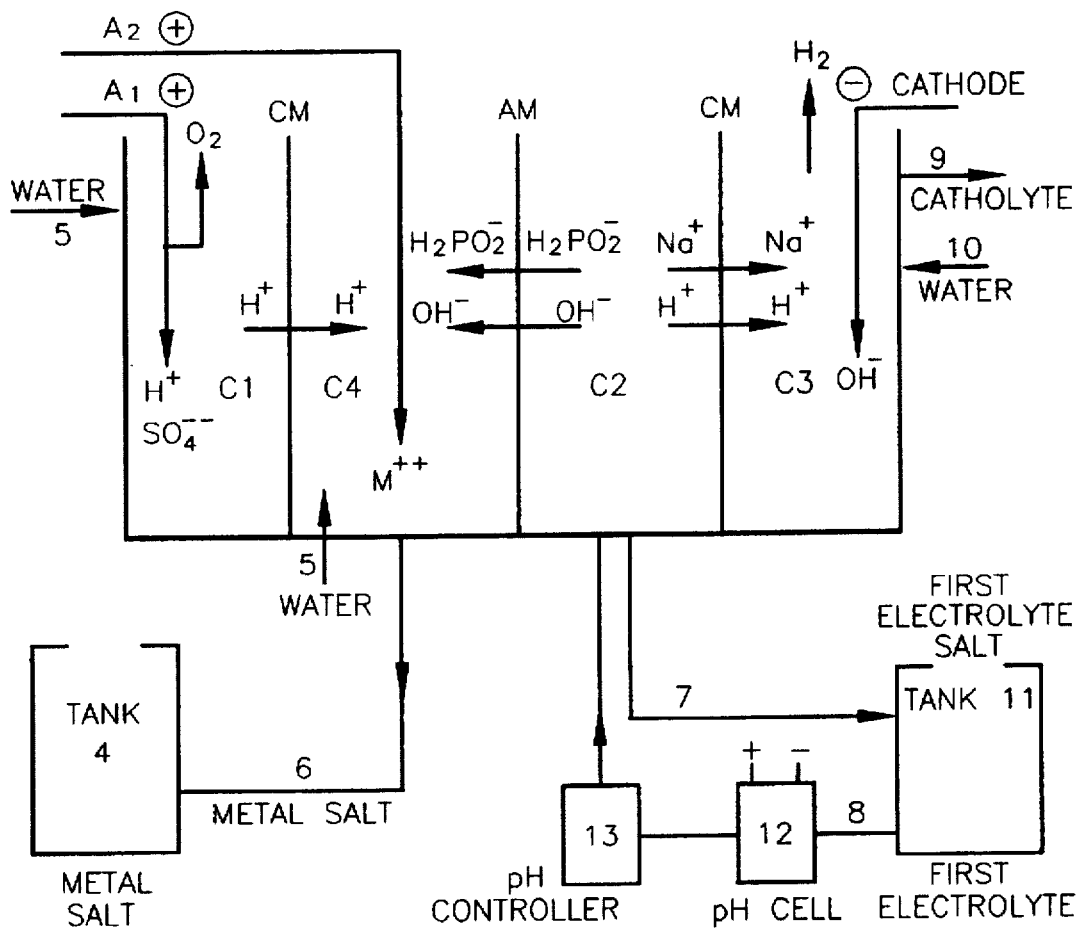
Figure 3:
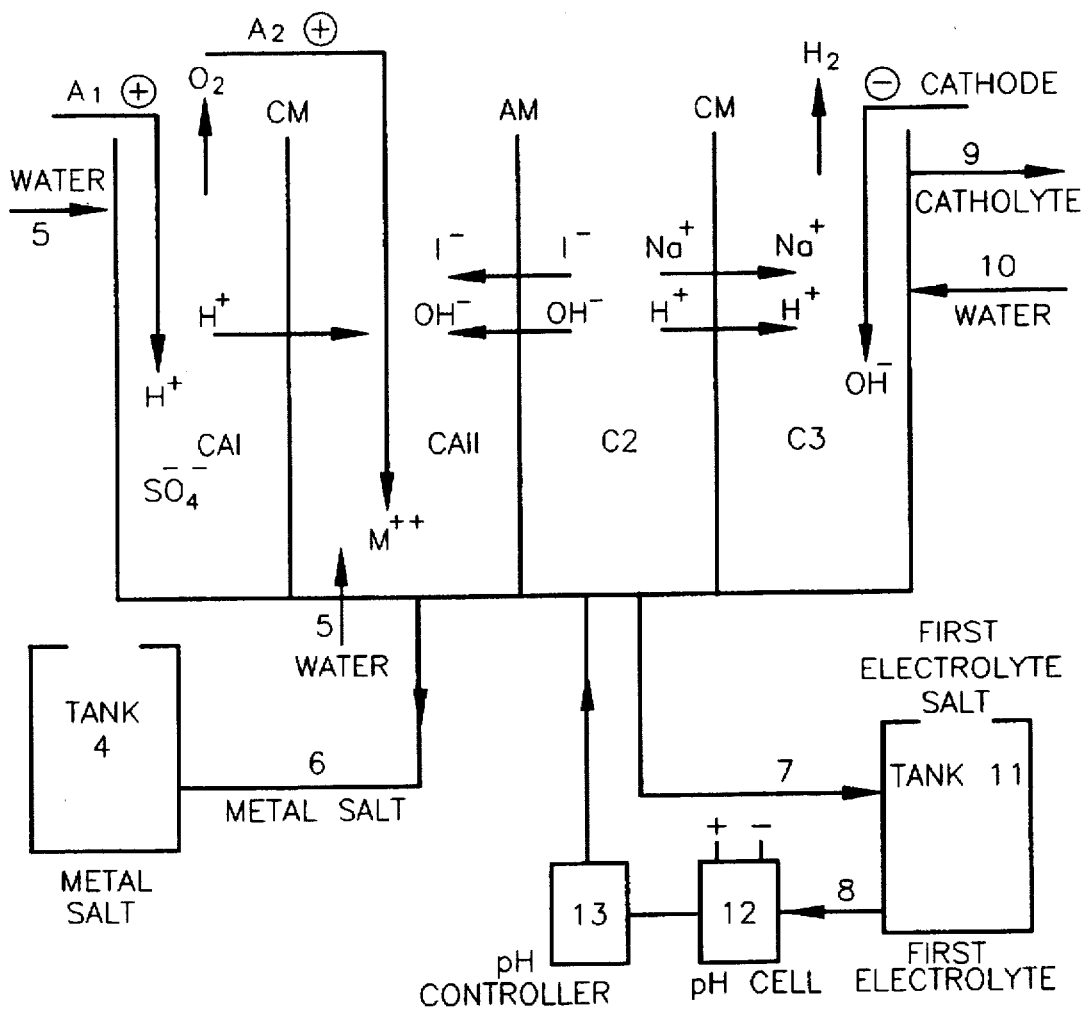
Figure 4:
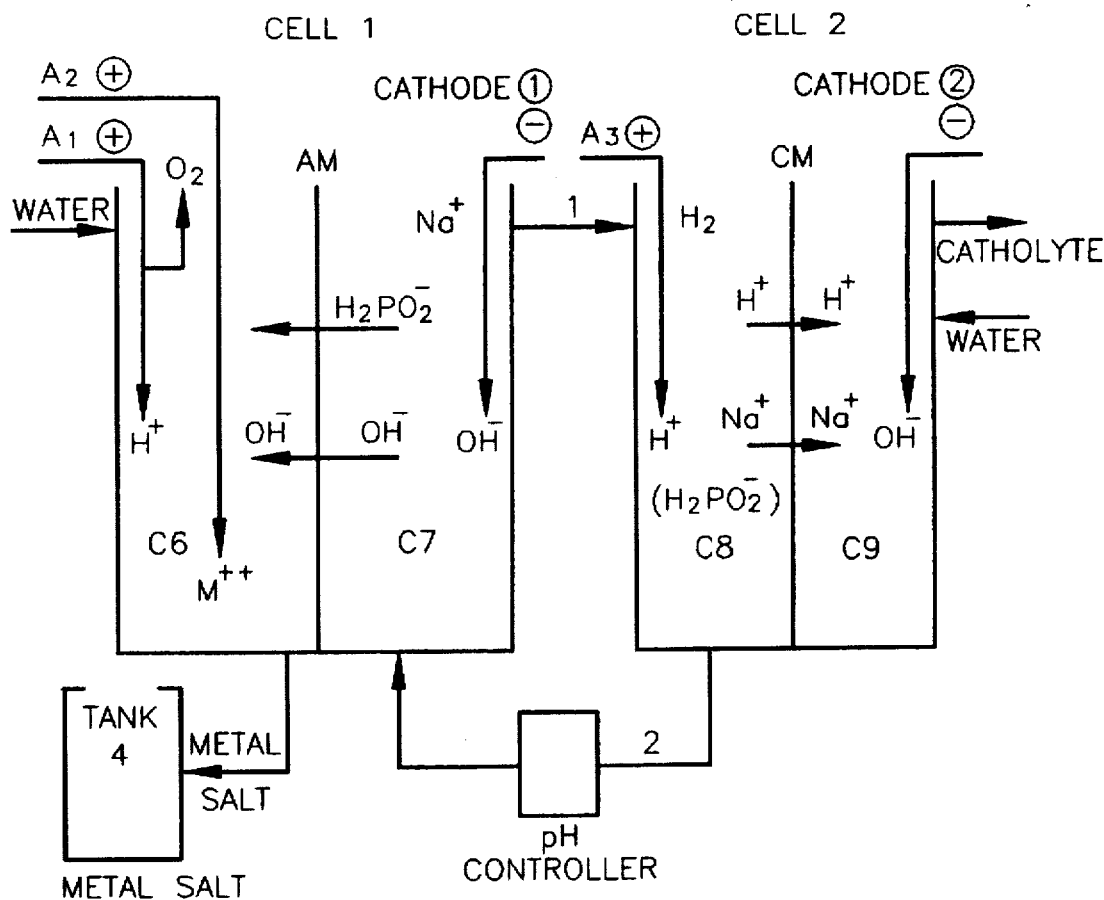
Figure 5:
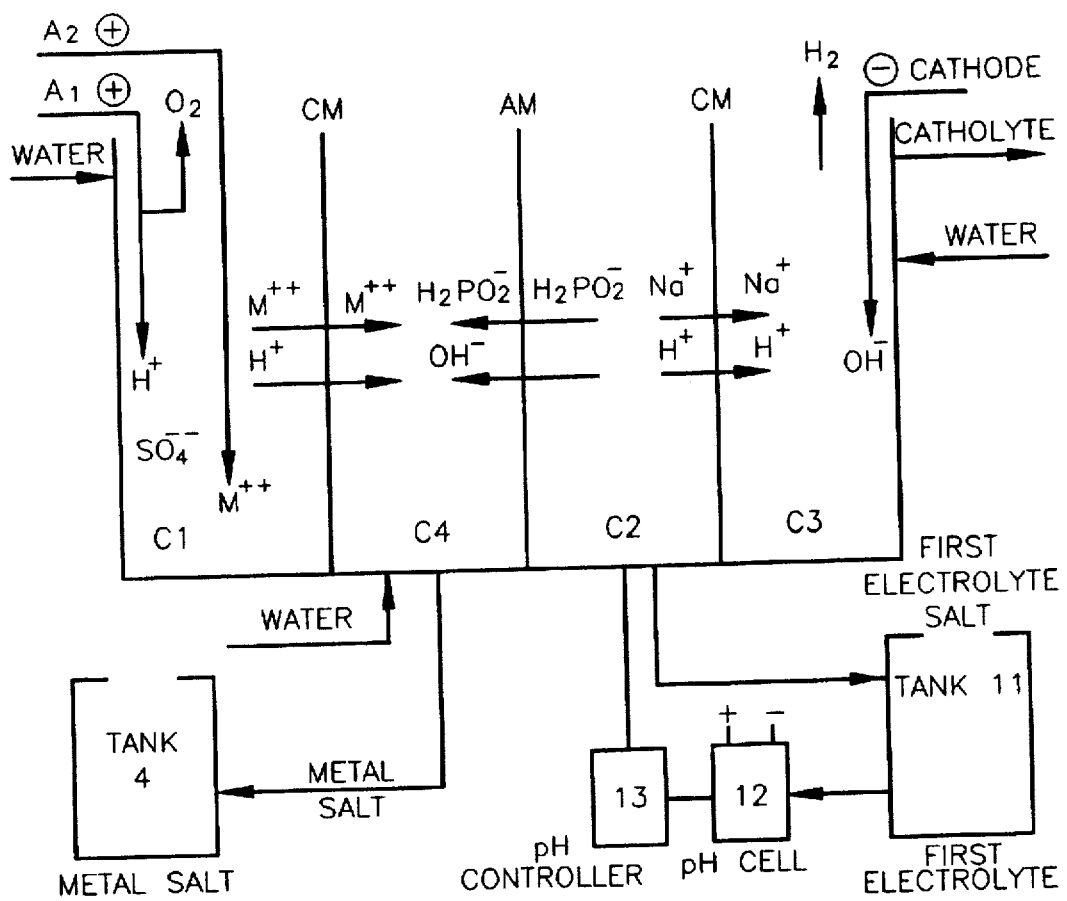
Figure 6:
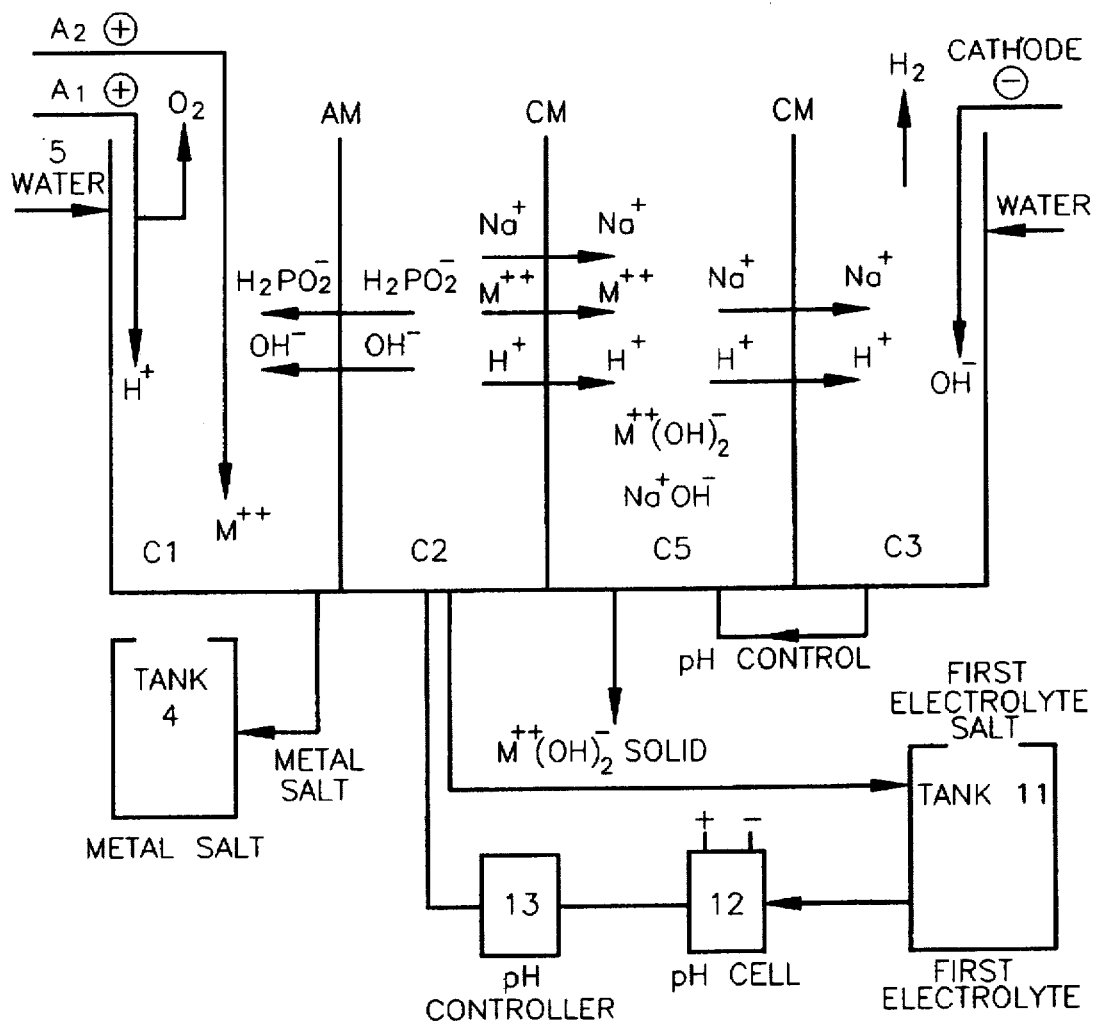
Figure 7:
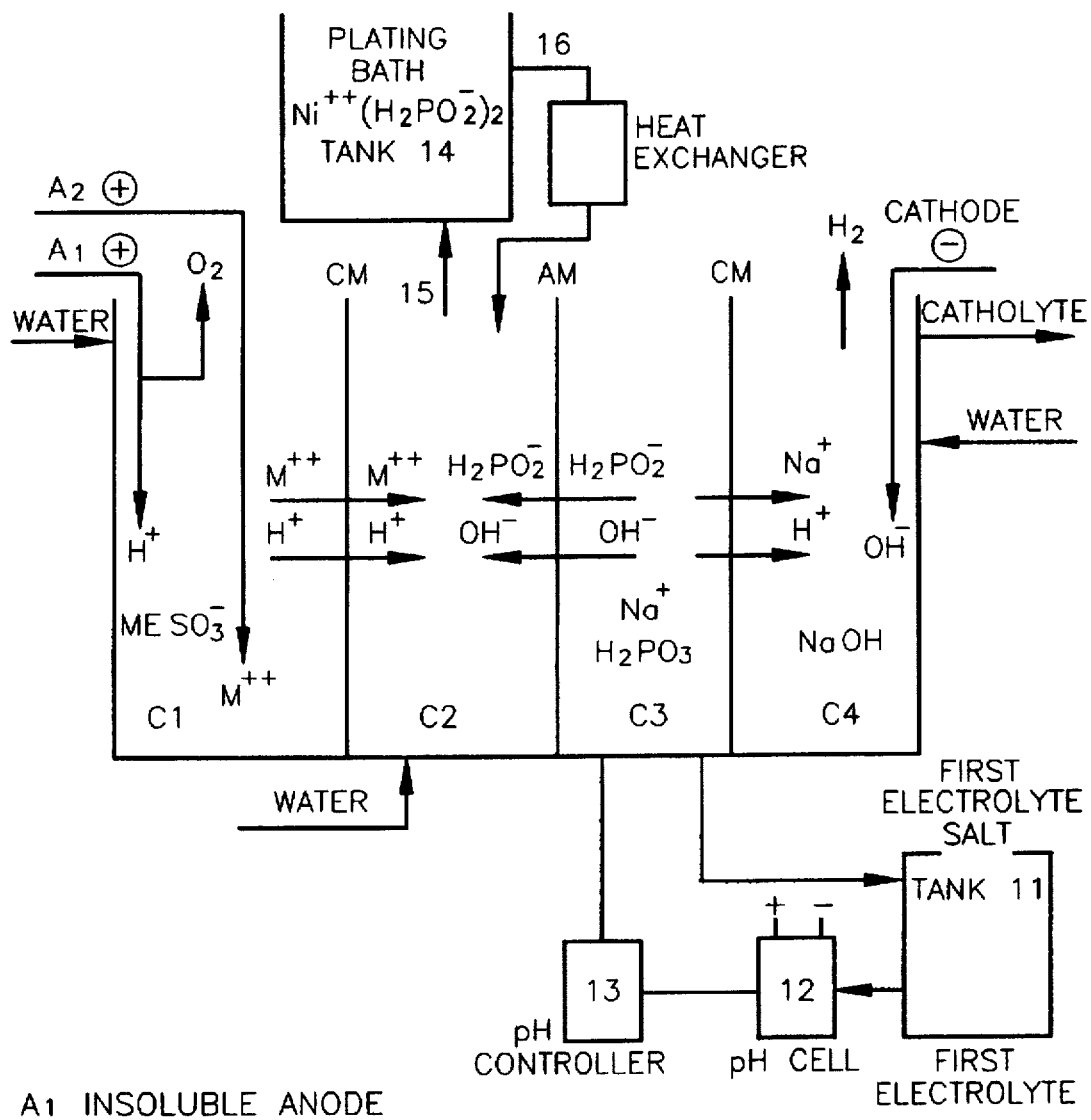
Figure 8:
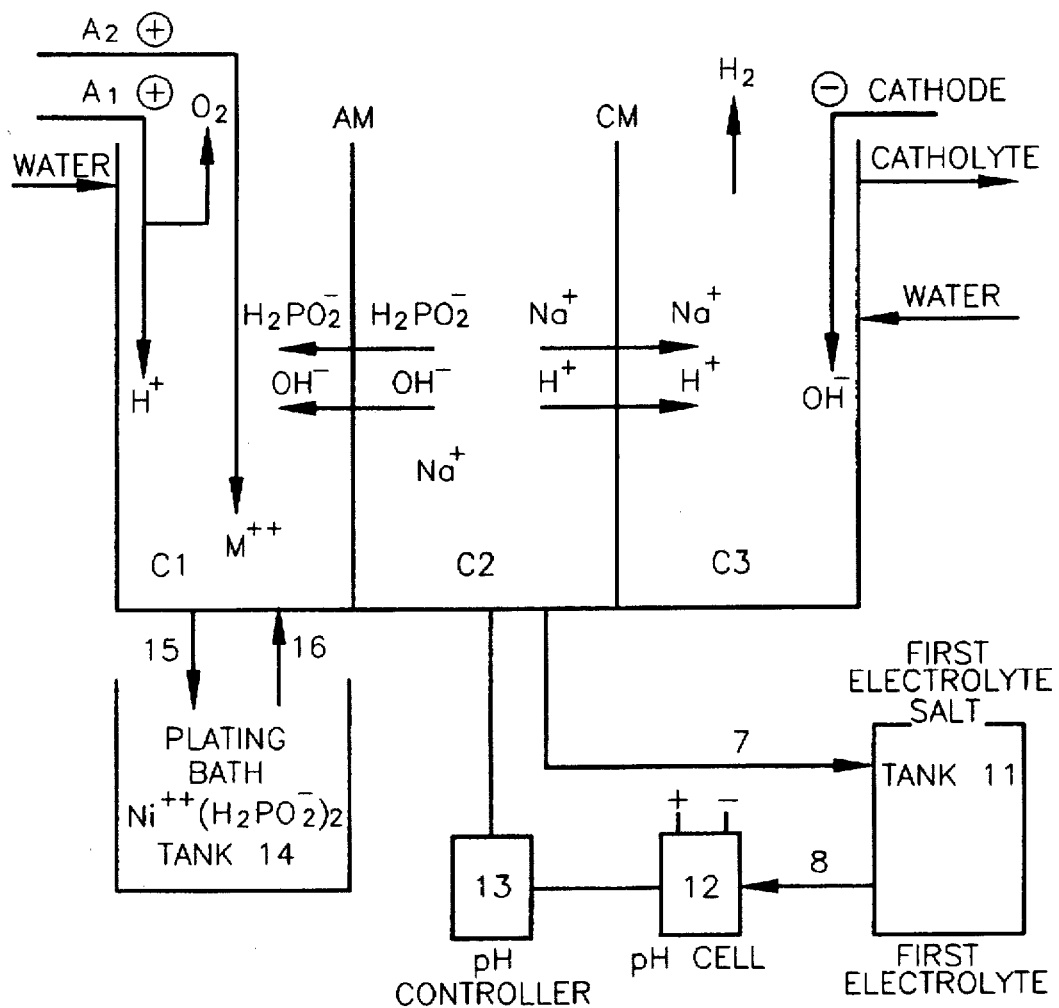
Figure 9:
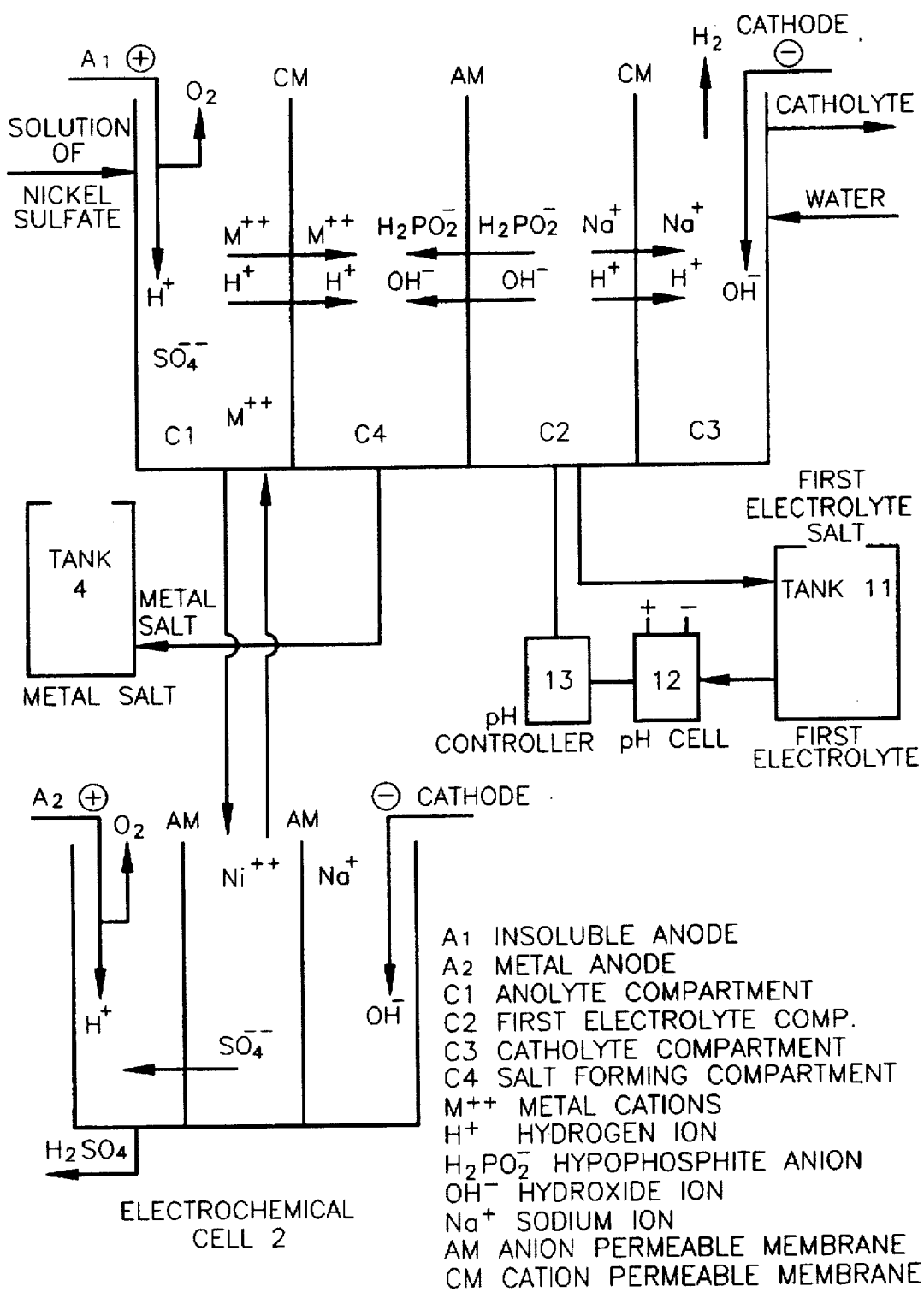
Figure 10:
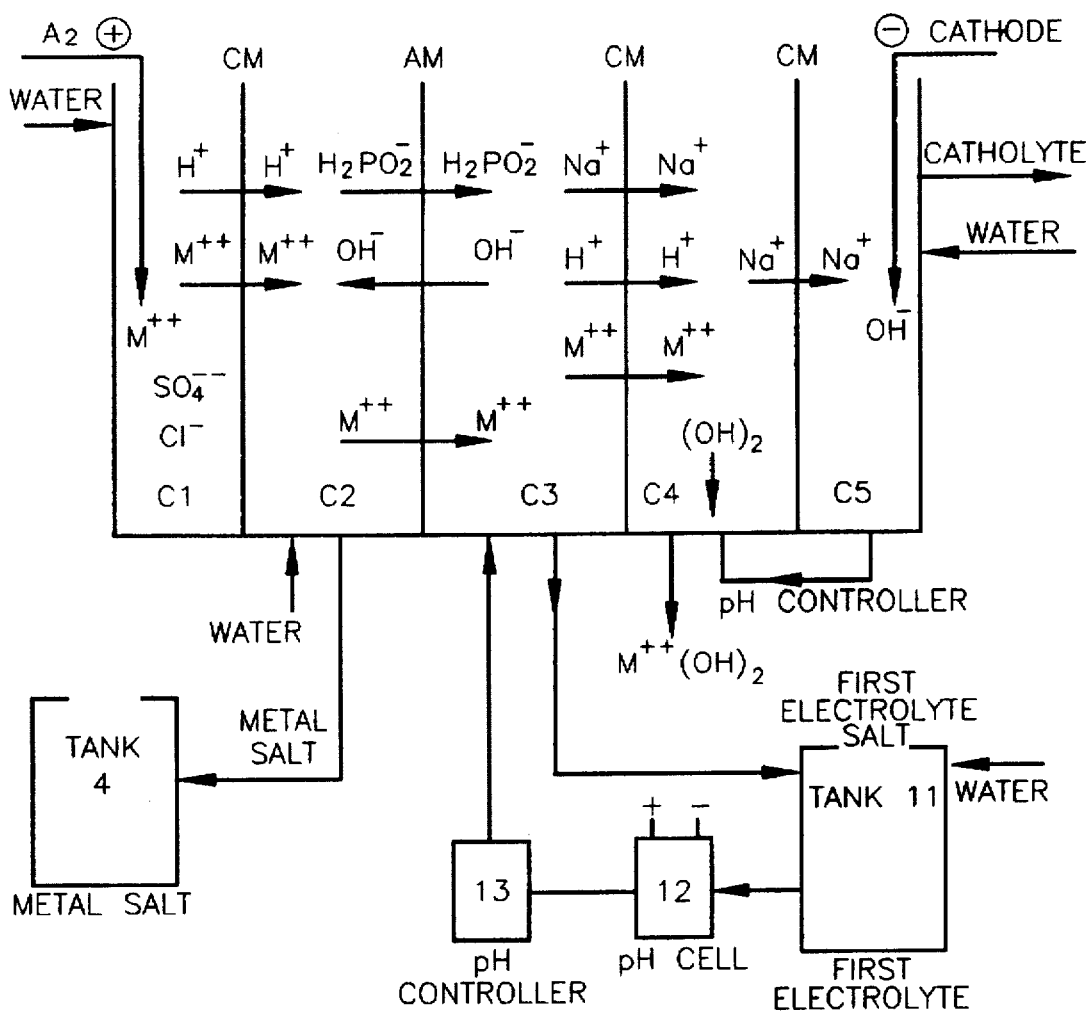

The electrodialytic process of the instant invention is preferably carried out in a cell having at least an anolyte, a first electrolyte and a catholyte. The first electrolyte is separated from the anolyte by an anion permeable membrane and from the catholyte by a cation permeable membrane. The first electrolyte is an aqueous solution of a salt, preferably an alkali salt. The anolyte is an aqueous solution of a metal salt in contact with a metal anode that is anodically converted to metal cations. The catholyte is an aqueous solution preferably an alkali hydroxide containing the cation of the first electrolyte salt. The process is carried out continuously as shown in FIG. I in simultaneous oxidation, reduction and ion transport steps. Metal ions are formed by oxidation of the metal anode and dissolution of the metal ions into the anolyte. Anions of the first electrolyte are electrotransported through the anion permeable membrane into the anolyte to ionically neutralize the cations of the anolyte. Cations of the first electrolyte are electrotransported through the cation permeable membrane into the catholyte and are preferably ionically neutralized by hydroxide ions formed at the cathode by the cathodic reduction of water. The electrodialytic process is driven by electrical energy that is converted to chemical energy as electrons at the cell electrodes. Electrons are added at the cathode and removed at the anode. The electrons added and removed are equal. Unfortunately, the efficiencies of the simultaneous oxidation-reduction and ion transport steps are not the same. I have found that it is necessary to balance the efficiencies of the simultaneous steps by controlling the hydrogen and hydroxide ion concentration, pH, of the first electrolyte, and to compensate for hydroxide ion transport to the anolyte by the electrolysis of water to form hydrogen ions at the cell anode.

The electrolytic cell as shown in FIG. I is divided into three compartments with an anion permeable membrane (AM) separating the anolyte and first electrolyte and a cation permeable membrane (CM) separating the first electrolyte and the catholyte. The anolyte compartment C1 contains an anode and an anolyte. The compartment C2 contains an electrolyte, hereinafter referred to as the "first electrolyte". The compartment C3 is the catholyte compartment containing a cathode and a catholyte.

The anolyte compartment C1 has a means for adding a metal, as an anode A1, for oxidation and dissolution as metal ions in the anolyte. The anolyte compartment C1 has conduits 5 and 6 for adding water, removing anolyte and removing oxygen. Compartment C1 has an insoluble anode A1 for electrolysis of water.

The first electrolyte compartment C2 has conduits 7 and 8 for circulating the first electrolyte through compartment C2 and, preferably, to tank 11 where electrolyte chemicals are added to maintain the desired composition of the first electrolyte. It is preferable to add materials, especially solids to tank 11 and circulate the solution through compartment C2. The pH of the first electrolyte is controlled, preferably using an electrochemical cell in conduit 8.

The catholyte compartment C3 has a means of adding water as required to maintain concentration of the catholyte, conduit 10 and conduit 9 for removal of catholyte and hydrogen.

To illustrate the best mode of operating the process, the anolyte is an aqueous solution of nickel hypophosphite. The anode is nickel. The first electrolyte is an aqueous solution of sodium hypophosphite, preferably a solution saturated with sodium hypophosphite. The catholyte is a 10 wt. % aqueous solution of sodium hydroxide. When an electric current is passed through the cell from anode in compartment C1 to cathode in compartment C3, nickel is oxidized to form nickel ions in the anolyte simultaneous with the transport of hypophosphite ions from the first electrolyte to the anolyte and sodium ions from the first electrolyte to the catholyte where water is reduced to form hydroxide ions and hydrogen.

When it is desirable to make, for example, an increase in the ratio of hypophosphite anions to hydroxide ions electrotransported from the first electrolyte to the anolyte, sodium ions are removed from the first electrolyte, preferably in electrochemical cell 12 and replaced by hydrogen ions in the first electrolyte whereby the pH of the first electrolyte is decreased to the desired level.

When it is desirable to make, for example, an increase in the acidity of the anolyte or to compensate for the electrotransport of hydroxide ions from the first electrolyte, it is desirable to use an insoluble anode to effect electrolysis of water to produce hydrogen ions and oxygen in the anolyte. Hydrogen ions and oxygen can also be formed by increasing voltage and current density of the nickel anode. When it is desirable to effect minimum oxidation of the anolyte, the insoluble anode is usually preferable.

When it is desirable to make, for example, a more acidic interface on the anode side of the anion permeable membrane to prevent crusting or when dissolving a crust, it is preferable to decrease the pH of the first electrolyte and to increase the acidity of the anolyte. To dissolve an insoluble metal hydroxide in the anolyte, it is preferable to increase the acidity of the anolyte by forming hydrogen ions at the insoluble anode and to decrease the transport of hydroxide ions by decreasing the pH of the first electrolyte.

The anolyte of the process of this invention is an aqueous solution of a metal salt that is electrically conductive. A preferred anolyte is an aqueous solution of metal cations and anions that are capable of reducing the metal cations to a metal, for example, nickel hypophosphite. The anolyte may contain a mixture of salts comprising one anion and two or more different metal cations or two or more anions and one or more cations. The preferred anolyte is an aqueous solution of a metal salt containing a low concentration of acid and a high concentration of metal salt.

The pH or acidity of the anolyte may be adjusted by the electrolysis of water to form hydrogen ions in the anolyte. A preferred method is to pass an electric current through the cell from an insoluble anode to the cathode of the salt-forming cell. The electrical power source can be that of the salt-forming cell or another power source connected to the insoluble anode and the cathode of the salt-forming cell. The pH of the anolyte may be adjusted and controlled by the electrolysis of water at the soluble metal anode or a containment for the metal anode.

The metal anode of the process of this invention is any metal that is anodically conductive and dissolvable in an anolyte as metal cations. The metal anode can be a pure metal or a metal alloy or have two or more metals. The anode can be of any shape but particles of high surface area, such as wafers, crowns, chips and spheres are preferred. Preferably, the metal particles are contained in an electrically conductive basket that is insoluble and non-anodic.

The insoluble anode of the process of this invention may be any electrically conductive, electrolytically active material resistant to the anolyte. Materials such as a valve metal of titanium, tantalum or alloys thereof, bearing on its surface a noble metal, a noble metal oxide or other electrolytically active materials are generally preferred. The anode may be a ceramic of reduced oxides of titanium and other electrocatalyst.

The cathode used in the process of this invention may be any electrically conductive material resistant to the catholyte.

The catholyte of the process of this invention is an aqueous solution containing the cation of the salt of the first electrolyte. A preferred catholyte is an aqueous solution of an alkali hydroxide.

The first electrolyte of the instant invention is an aqueous solution containing a salt, the anions of which are electrotransportable through an anion permeable membrane and which form a soluble salt with a metal cation. Preferably, the cation of the salt is a cation of an alkali metal. The pH of the first electrolyte may be varied over a wide range from the pH of the acid of the salt anion to the pH of an alkali metal hydroxide. Preferably, the pH is 7 or less. The first electrolyte can contain agents to selectively insolubilize or ionically immobilize cations that may cause fouling of the cation permeable membrane separating the first electrolyte from the catholyte. The first electrolyte may contain two or more salts of different cations and anions.

The pH of the first electrolyte may be adjusted and controlled using several methods suitable for removing cations and replacing the salt cations with hydrogen ions. The pH could be adjusted by adding an acid to the first electrolyte. Preferably, the pH is adjusted and controlled electrodialytically using an electrochemical cell having at least a catholyte and an anolyte separated by an ion permeable membrane. The first electrolyte, if the membrane was cation permeable, would be the anolyte whereby cations are removed from the first electrolyte to the catholyte.

The salt-forming electrolyte of this invention may be the anolyte or an electrolyte separated from the anolyte by a cation permeable membrane and from the first electrolyte by an anion permeable membrane whereby metal cations are electrotransported from the anolyte to the salt-forming electrolyte and anions are electrotransported from the first electrolyte to the salt-forming electrolyte.

The reactor electrolyte of this invention is a solution of a salt of an acid, which acid in a one normal solution would have a pH no greater than three and forms a soluble salt with a metal cation and agents that insolubilize or ionically immobilize metal cations. The pH of the reactor electrolyte is preferably greater than the pH at which metal cations become insoluble hydroxides.

Any anion permeable membrane can be used to separate the electrolytes of the process of this invention. The membranes must be sufficiently stable to the electrolytic environments and mechanically suitable for design and economical operation of the process. Anion permeable membranes usually have fixed positive charges and, as the name implies, are permeable to negatively charged ions. The membranes are preferably membranes of hydrocarbon and halocarbon polymers containing ammonium or tertiary amine groups. The most preferred membranes are those chemically stable to an alkaline electrolyte. Suitable membranes are Ionac® MA3475 from Sybron Chemical, Tosflex® IESA48, a fluorinated membrane from Tosoh Corporation and Selemion® AMP membrane from Asahi Glass.

Any cation permeable membrane can be used to separate electrolytes of the electrochemical process of this invention. Cation permeable membranes usually have fixed negative charges and are permeable to positively charges ions. They are preferably membranes of hydrocarbon and halocarbon polymers containing acid and acid derivatives distributed in a polymer matrix. The membrane may be multi-layered structures of different polymers containing reinforcements, fillers, and chemical modifiers. The most preferred membranes are perflourosulfonic acid membranes such as Nafion®, manufactured by E. I. dupont de Nemours & Company and Flemion® perfluorinated membranes made by Asahi Glass. The most perferred membrane for the separation of the catholyte from the first electrolyte is Nafion® 350 membrane having two films of different equivalent weights wherein the film of highest equivalent weight faces the cathode.

The electrodialytic cell of the process of this invention is any cell having at least an anolyte, a first electrolyte and a catholyte wherein the first electrolyte is separated from a salt-forming electrolyte by an anion permeable membrane. A preferred cell is a cell having a first electrolyte separated by an anion permeable membrane from an anolyte containing a soluble metal anode and by a cation permeable membrane from a catholyte. In this mode of cell configuration, the anode in the anolyte forms metal cations which are ionically neutralized by anions electrotransported from the first electrolyte to the anolyte. Cells of different compartmentation may be used in the process of this invention. For example, the soluble metal anode could be dissolved in an anolyte separated by a cation permeable membrane from a salt-forming electrolyte as shown in FIG. V. The salt-forming compartment is separated by an anion permeable membrane from the first electrolyte. A compartment C5, FIG. VI, could be added between the first electrolyte and the catholyte to effect removal or ionic immobilization of multivalent metal cations, as disclosed in my U.S. Pat. No. 4,636,288. The salt-forming electrolyte could be an electroless nickel plating bath whereby nickel metal is dissolved to replace nickel as nickel is plated (FIG. VII and FIG. VIII). The salt-forming electrolyte could be the anolyte or an electrolyte separated by a cation permeable membrane from the anolyte. The salt-forming electrolyte could be the anolyte and the first electrolyte the catholyte of one cell and essentially the anolyte of a second cell as shown in FIG. IV. The cell could have two anolytes separated by a cation permeable membrane having an insoluble anode in one anolyte and a soluble anode in the other anolyte (FIG. II). The cell could have two anolytes and two catholytes. A cell could have five electrolytes, FIG. X, an anolyte, salt-forming electrolyte, first electrolyte, a reactor electrolyte and a catholyte. A five electrolyte cell could have an anolyte, a salt-forming electrolyte, an ion bridge electrolyte containing an acid of the anions of the first electrolyte, a first electrolyte and a catholyte.

It should be understood that there are many variations possible in cell compartmentation and electrolytes possible in the process of this invention. Therefore, the pH values of the electrolytes will vary depending on the function of the electrolyte. Operation of the process is possible for short periods without control of the pH values of all electrolytes. However, for continuous and efficient operation, the pH of the anolyte or salt-forming electrolyte must be less than the pH at which the metal cation forms an insoluble hydroxide and the pH of the first electrolyte must be a value suitable for control of the pH of the salt-forming electrolyte and preferably a value sufficiently low to preclude forming a metal in the electrolyte as the result of metal ions migrating from the salt-forming electrolyte to the first electrolyte and reacting with anions to form metal. The pH of the first electrolyte is preferably low enough to not degrade the anion membrane. For example, a preferred electrochemical cell for making salts of metal cations and anions capable of reducing the metal ions to metal, i.e., nickel hypophosphite, would have five compartments or electrolytes (FIG. X). The anolyte would preferably contain an anion that does not reduce metal ions and a soluble nickel anode to form nickel ions. The nickel ions are transported through a cation membrane to a salt-forming electrolyte separated by an anion membrane from a first electrolyte containing hypophosphite ions which are transported to the salt-forming electrolyte to form nickel hypophosphite. The first electrolyte is separated from a reactor electrolyte by a cation permeable membrane. The reactor electrolyte preferably contains a salt of anions that do not reduce metal ions and hydroxide or other agents that insolubilize or ionically immobilize metal cations (see U.S. Pat. No. 4,636,288) to prevent metal ions from fouling a cation membrane separating the reactor electrolyte from a catholyte, preferably an alkali hydroxide. A preferred pH of the respective electrolytes is: anolyte<4, salt-forming<3, first electrolyte<3, reactor electrolyte>7, catholyte 14.

The pH of the electrolytes can be controlled by several methods, such as the addition of acids and bases, ion exchange and electrodialytic processes. It is preferable to control the pH of the anolyte by forming hydrogen ions simultaneously with the formation of metal ions and effecting the transport of both ions at the ratio required to control the pH of the salt-forming electrolyte. The pH of the first electrolyte is preferably controlled by the electrodialytic removal of alkali or other cations and replacing the cations with hydrogen ions. This electrodialytic process preferably contains an anolyte, first electrolyte, a reactor electrolyte to insolubilize metal ions and a catholyte separated by cation permeable membranes. The pH of the reactor electrolyte is preferably controlled by feeding the catholyte (an alkali hydroxide) to the reactor electrolyte as required and removing the alkali ions back to the catholyte again to form alkali hydroxide. Although several methods can be used to control pH, it is preferable to use the electrodialytic method since no additional chemicals are required and there is essentially no waste.

The objects of this invention are accomplished using an electrochemical cell having at least a salt-forming electrolyte separated by an anion permeable membrane from a first electrolyte that contains the anion of the metal salt to be formed. Anions of the first electrolyte are electrotransported from the first electrolyte through an anion permeable membrane into a salt-forming electrolyte. The salt-forming electrolyte can be the anolyte wherein metal cations are formed from metals or it can be an electrolyte separated by a cation permeable membrane from the anolyte or an electrolyte containing metal cations of the metal salt to be formed. The invention is not limited to the cell configurations and equipment as shown in the Figures.

EXAMPLES

Example 1

To illustrate the practice of this invention, the electrolytic cell shown schematically in FIG. I was assembled. The cell body was made of a frame of Teflon® having an opening for electrolysis of 9.29 sq. decimeters. The cell cathode was enclosed in the frame by a Nafion® 350 membrane to form the catholyte compartment and by a Selemion® AMP anion permeable membrane to form the first electrolyte compartment. Conduits were provided for fluids in and out of the compartments. This cathode assembly was put into a tank containing an anolyte. A titanium mesh basket was placed in the anolyte and connected to the positive terminal of a rectifier. Metal wafers, crowns and chips were added to the basket as the soluble metal anode. The cathode was connected to the negative terminal of a rectifier rated for 300 amperes direct current and 0 to 12 volts. The anolyte and catholyte compartments were equipped for adding water to control concentration of the respective electrolytes. The first electrolyte compartment was equipped with a means to circulate the first electrolyte from tank 11 through the first electrolyte compartment of the cell and back to tank 11. The first electrolyte compartment was also equipped to circulate the first electrolyte through the anolyte compartment of a pH controll cell 12 having a catholyte separated by a 350 Nafion® membrane from the anolyte. A pH controller 13 was used to activate and deactivate the electrocell as required to adjust and control the pH of the first electrolyte. The salt of the first electrolyte was added to the first electrolyte in tank 11, perferably as a solid to maintain a salt-saturated first electrolyte. The anolyte compartment was equipped with conduits for adding water and removing the anolyte. The first electrolyte and catholyte were equipped with heat exchange for controlling temperature of the electrochemical process. The anolyte compartment contained an insoluble anode ($A_1$) having a titanium base metal and a platinum coating. The anode was electrically connected through the rectifier to the cell cathode.

In the following description it should be understood that the cell compartments C1, C2 and C3 and associated tanks 10, and 11 are sometimes described as compartments. The cell was connected to a rectifier made by Dynapower that was equipped to control voltage or amperage and to measure and record ampere hours of electrolysis. The process was carried out continuously. For start-up the anolyte was a 1 wt. % solution of hypophosphorous acid. The titanium basket was filled with nickel wafers, the first electrolyte was a saturated solution of sodium hypophosphite and the catholyte, a 10 wt. % solution of sodium hydroxide. The cell amperage was increased stepwise until the anolyte contained 30 g/l of nickel hypophosphite. The pH of the first electrolyte was controlled at 6.5 to 7.0 and the concentration of the catholyte at 10 wt. % sodium hydroxide. The process operated smoothly at 150 and 175 amperes and the electrolytic efficiency of dissolving the metal anode was 95% of theory. After four hours of operation, the pH of the first electrolyte was allowed to increase to 10.5 to 11.0. After one hour of operation there was a loss of amperage and some solids were observed in the anolyte. Electrolysis of water in the anolyte reduced the pH from 4.5 to 3.0 and the solids dissolved. The amperage, however, did not increase until the pH of the first electrolyte was reduced to 7.5 to 8.0. A series of experiments was carried out varying the pH of the first electrolyte and the acidity of the anolyte. These tests clearly demonstrated that the pH of the anolyte must be less than the pH at which the metal cation forms an insoluble hydroxide and that the pH of the first electrolyte must be low enough to form a liquid interface on the anolyte side of the anion permeable membrane that has a pH less than the pH at which a metal cation would form a metal hydroxide crust on the membrane with hydroxide ions electrotransported from the first electrolyte to the anolyte. The pH of the first electrolyte and the pH of the anolyte are interrelated; however, for efficient long-term operation, it is desirable to operate with independent adjustments of pH of the two electrolytes.

Example 2

The cell and associated equipment of Example 1 was used in Example 2 with the exception that the metal anode was tin. The anolyte was changed from nickel hypophosphite to a 1 wt. % solution of hypophosphorous acid for start-up. The start-up and operating procedures were substantially those of Example 1. After two hours of operation, there was a loss of amperage and the appearance of solids in the anolyte. The pH of the first electrolyte was reduced from 7.0 to 4.0 and then to 3.0. Electrolysis of water in the anolyte reduced the pH to 2.0 and most of the solids went into solution. The operation became stable over a four hour period at a first electrolyte pH of 4.0 and an anolyte pH of 2.0. A series of experiments was run varying pH of the anolyte and first electrolyte. The differences in operation between Example 1 and Example 2 can be explained by the differences in pH at which nickel and tin form insoluble hydroxides. Stannous ions form a hydroxide at a pH of 2.0 to 2.5 and nickel ions form a hydroxide at a pH of 6.5. This Example clearly demonstrates the need to adjust and control the electrolysis of water for adding hydrogen ions to the anolyte and to adjust the pH of the first electrolyte to compensate for transport of hydroxide ions from the flint electrolyte when forming salts of different metal cations.

Example 3

The cell of Example 1 was changed to have a salt-forming electrolyte between the anolyte and the first electrolyte. The salt-forming electrolyte was separated from the anolyte by a cation permeable membrane and from the first electrolyte by an anion permeable membrane (FIG. II). The anolyte was a saturated solution of nickel sulfate; the salt-forming electrolyte at start-up, a 0.5 wt. % solution of hypophorous acid; the first electrolyte a saturated solution of sodium hypophosphite; and the catholyte, a 10 wt. % solution of sodium hydroxide. The metal anode was nickel. Amperage was increased in steps until the salt-forming compartment contained 20–25 g/l of nickel hypophosphite. The amperage of the cell was then set at 200 for continued operation. The amperage of the cell slowly decreased to 100 and there was fouling of the cation membrane on the salt-forming electrolyte side of the membrane. The pH of the salt-forming electrolyte was 4.5. Reducing the pH of the first electrolyte from 6.5 to 3.0 resulted in an increase in amperage and reducing the pH of the anolyte restored operation. It is clear from this Example that the efficiencies of metal dissolution, and cation and anion transport efficiencies must be balanced in a multicompartmented cell in order to form salts in a salt-forming compartment separated from an anolyte by a cation permeable membrane and from a first electrolyte by an anion permeable membrane. This mode of operation is also applicable for halide anions and anions that are unstable in the oxidizing environment of an anolyte.

Example 4

The cell of Example 1 was changed as shown in FIG. III. The insoluble anode ($A_1$) was separated from the metal anode ($A_2$) by a cation permeable membrane to form two anolytes, anolyte I containing the insoluble anode ($A_1$) and anolyte II containing a soluble metal anode ($A_2$). Anolyte I was a 5 wt. % solution of sulfuric acid and compartment CAI containing the insoluble anode was equipped with conduits for adding water and venting oxygen. The operating procedure of Example 1 was followed except for the chemicals. The metal anode ($A_2$) was nickel wafers in a titanium basket. The first electrolyte was a saturated solution of sodium iodide and the catholyte a 10 wt. % solution of sodium hydroxide. A 1 wt. % solution of hydriodic acid was added to anolyte II for start-up. The insoluble anode ($A_1$) was electrically connected through a rectifier to the cathode of the salt-forming cell to provide a controlled source of hydrogen ions for transport to anolyte II. Cations were removed from the first electrolyte in an electrodialytic cell having an anolyte, a feed electrolyte and a catholyte separated by cation permeable membranes. The first electrolyte was the feed electrolyte to the pH control cell. The catholyte was a solution of sodium hydroxide and the anolyte a 4 wt. % solution of sulfuric acid. The salt-forming cell was started up stepwise by increasing voltage and amperage. After one hour, the concentration of anolyte II was 15 wt. % nickel iodide and this concentration was maintained by adding water to anolyte II. The catholyte was maintained at 10 wt. % and the first electrolyte as a saturated solution of sodium iodide. The cell amperage was controlled at 200 amperes, the pH of the anolyte II at 2.5 to 3.5 and the pH of the first electrolyte at 5.0 to 7.0. These conditions provided smooth and efficient operation with no apparent fouling of membranes. After four hours of operation, a series of tests was carried out varying the pH of the first electrolyte and anolyte II. When the pH of the first electrolyte was 12 or higher, membrane fouling and loss of amperage were significant. When the pH of anolyte II was 4.5–5.0, some solids began to appear in anolyte II. The process of Example IV was easily controlled. It increases the scope of salts that can be made by dissolution of a metal in an anolyte essentially free of oxygen and anodic oxidation.

The foregoing Examples illustrate a method for controlling the imbalance of electrolytic and electrodialytic efficiencies of a multicompartment cell for making metal salts. The concentration of hydrogen ions and of hydroxide ions must be offset to maintain the required electrolyte pH to prevent forming insoluble hydroxide in an anolyte and fouling a membrane with insolube metal hydroxides. The instant invention is broadly applicable for making metal salts with anions of alkali salts.

Example 5

The cell of Example 1 was changed (FIG. V) to have a salt-forming electrolyte between the anolyte and the first electrolyte. The salt-forming electrolyte was separated from the anolyte by a cation permeable membrane, Nafion® 450 and from the first electrolyte by an anion permeable membrane, Tosflex® IESF34. The catholyte was separated from the first electrolyte by a cation permeable membrane, Nafion® 350. The anolyte was an essentially saturated solution of nickel methane sulfonate having a pH of 2 and containing a nickel anode and an insoluble titanium mesh anode having an iridium oxide electrocatalyst. The salt-forming electrolyte was a solution of nickel hypophosphite consisting of 25 to 28 g/l of nickel hypophosphite and having a pH of 2.5; the catholyte, a 5 wt. % solution of sodium hydroxide; and the first electrolyte, a saturated solution of sodium hypophosphite having a pH of 5.0. An electrical current was passed through the cell at 100 to 150 amperes and the pH of the electrolytes maintained. The process was operated continuously for 70 hours with an electrolytic yield of nickel hypophosphite of 92.5% of theory.

Example 6

The objects of this invention are accomplished using an electrochemical cell having at least a salt-forming electrolyte separated by an anion permeable membrane from a first electrolyte that contains the anion of the metal salt to be formed provided that the electrotransports and efficiencies of the various cell functions are accomplished; i.e., the anodic dissolution of a metal, the electrotransport of an anion of the metal salt to be formed and the transport of hydrogen and hydroxide ions related to the pH of aqueous electrolytes. Two cells were assembled (FIG. IV). Cell 1 was divided by a Selemion® AMP anion permeable membrane and Cell 2 by a Nafion® 350 cation permeable membrane. Cell 1 anolyte contained a nickel anode and an insoluble anode. The anolyte was an essentially saturated solution of nickel hypophosphite having a pH of 2.5. The catholyte of Cell 1 was essentially a saturated solution of sodium hypophosphite having a pH of 4.5. Cell 2 had a titanium mesh anode with an iridium oxide coating. The cathode of Cell 1 was a titanium mesh coated with nickel and the cathode of Cell 2, a steel mesh coated with nickel. The anolyte of Cell 2 was essentially the catholyte of Cell 1 and the catholyte of Cell 2 was a 5 wt. % solution of sodium hydroxide. Two rectifiers were used, one for each cell. Conduits 1 and 2 were used to circulate the catholyte of Cell 1 through the anolyte compartment of Cell 2. Electricity was passed through each cell as required to maintain the pH of the anolyte and catholyte of Cell 1 (the first electrolyte of a three compartment cell). Acceptable operation was obtained over a four-hour period. This example illustrates that a metal salt can be made in an electrochemical cell having a metal salt-forming electrolyte (anolyte of Cell 1) separated by an anion permeable membrane from a first electrolyte containing the anion of the metal salt.

Example 7

The cell of Example 1 was modified (FIG. VII) to circulate an electroless nickel bath through the salt-forming compartment C2. Conduits 15 and 16. A heat exchanger was installed in Conduit 16 to reduce the plating bath temperature to a level acceptable for use of the Selemion® AMP membrane. The anolyte compartment C1 contained an insoluble metal anode and a nickel anode separated by a Nafion® 350 cation permeable membrane from the salt-forming electrolyte (plating bath) compartment C2. The anolyte was a saturated solution of nickel methane sulfonate having a pH of 2. The salt-forming electrolyte (plating bath) was a typical plating bath consisting of 28 g/l of nickel hypophosphite and additives at 70 degrees C. The first electrolyte was a saturated solution of sodium hypophosphite and the catholyte, a 5 wt. % solution of sodium hydroxide. Electricity was passed through the cell as required to maintain the concentration of nickel hypophosphite at 25 g/l to 28 g/l as nickel was plated from the bath onto substrates. The orthophosphite, oxidation product of the hypophosphite reducing agent, was removed electrodialytically as disclosed in my patent application Ser. No. 08.070,965. The pH of the first electrolyte was controlled in the range of 3.0 to 4.5. The pH of the anolyte was controlled in the range of 2 to 3, and the pH of the electroless bath at 4.5 to 4.7. Operation of the process was stable and the electrolytic efficiency for dissolving nickel and forming nickel hypophosphite was 92 to 93% of theory. Plating of nickel was carried out over seven days with controlled quality. This Example illustrates the electrodialytic production of nickel hypophosphite, its use for plating and the electrodialytic removal of the oxidation products of the hypophosphite reducing agent. This mode of operation is also applicable for manufacture of other metal salts and their simultaneous use.

A number of experiments was carried out wherein the electroless plating bath was the anolyte of the cell or a salt-forming electrolyte separated by a cation permeable membrane facing the anolyte. Organic additives are often used in electroless nickel bath formulations which could be anodically oxidized. Acceptable operation was obtained with organic additives that were typical of proprietary additives in commercial formulation, when the salt-forming electrolyte was separated from the insoluble anode and when the insoluble anode contained metal and metal oxide coating of the platinum group of metals. Acceptable results were obtained using the cell of FIG. VII.

These examples are not intended to limit the scope of this invention. It will become apparent from these teachings that all salt-forming nickel hypophosphite electrolytes of the process of this invention could be an electroless nickel plating bath.

Example 8

The cell of Example 1 was modified (FIG. IX) to feed a solution of nickel sulfate to the anolyte (cell 1—salt-forming) and to remove sulfate ions from the anolyte to maintain an essentially saturated nickel sulfate solution as the anolyte. The sulfate ions were removed electrodialytically in cell 2 (anion removal cell) having an anolyte separated by an anion permeable membrane from a feed electrolyte (the anolyte of cell 2, the salt-forming cell) and a catholyte separated by an anion permeable membrane or a bipolar membrane. The anolyte was a solution of sulfuric acid formed by the transport of sulfate ions into the anolyte and by electrolysis of water at the insoluble anode to form hydrogen ions. A 1 wt. % solution of sodium hydroxide was used as the catholyte. Selemion® AMP membranes were used to separate the electrolytes. The anolyte of the salt-forming cell was a solution of nickel sulfate separated by a Nafion® 450 cation permeable membrane from the salt-forming compartment which was separated from the first electrolyte by a Selemion® AMP anion permeable membrane which was separated from the catholyte by a Nafion® 350 cation permeable membrane.

The first electrolyte was a saturated solution of sodium hypophosphite and the catholyte, a 10 wt. % solution of sodium hydroxide. A solution containing 30 g/l of nickel hypophosphite was added to the salt-forming compartment. An electric current was passed through the cell at 150 amperes and the pH of the first electrolyte was adjusted to 4.5. The amperage of the sulfate removal cell 2 was adjusted to maintain the cell 1 anolyte at a pH of 2.5. The concentrations of the first electrolyte and catholyte of cell 1 were adjusted as required to maintain the start-up concentrations. The salt-forming electrolyte was maintained at 25 to 35 g/l of nickel hypophosphite. There were no problems of operation over a 7.5 hour period. This example illustrates the electrodialytic concentration of an anolyte to increase the transport efficiency of nickel ions to essentially the equivalent of an anolyte containing a soluble nickel anode. The efficiency of making nickel hypophosphite was 90 to 91% of theory.

Example 9

The cell of Example 1 was changed to include a salt-forming electrolyte and a reactor electrolyte as shown in FIG. X. The anolyte was an essentially saturated solution of nickel sulfate and nickel chloride containing a nickel anode and maintained at a pH of 2. The salt-forming electrolyte was a solution of nickel hypophosphite containing 35 g/l of nickel hypophosphite and maintained at a pH of 1.6 to 2.0. The first electrolyte was a saturated solution of sodium hypophosphite maintained at a pH of 2.0 to 2.5. The reactor electrolyte was a solution of sodium sulfate, sodium hydroxide maintained at a pH of 7.0 to 7.5 and the catholyte was a 15 wt. % solution of sodium hydroxide. These conditions were maintained while passing an electrolyzing current of 200 amperes through the cell. The cell compartments spacings were 0.31 cm. between membrane to membrane and membrane to electrodes. Operation was essentially continuous for 37 days, 24 hrs/day. The salt-forming electrolyte contained 35 to 37 g/l of nickel, 90–95 g/l of hypophosphite and 2 to 4 g/l of orthophosphite. There were trace quantities of nickel hydroxide in the reactor electrolyte. The function of the reactor compartment is to insolubilize any nickel ions migrating from the salt-forming electrolyte to the first electrolyte. This permits operation of the first electrolyte at a pH of 2.5 or less, a pH at which nickel ions are soluble and substantially non-reactive with hypophosphite. This five compartment arrangement is advantageous in that no nickel metal was formed in any cell compartment. However, the requirements for controlling the desired ion transports are much greater than a three compartment cell.

This example and others using five compartment cells show that nickel hypophosphite can be made at a desired concentration of 35 to 37 g/l with little excess of hypophosphorous acid and essentially no undesirable orthophosphite.

What is claimed is:

1. A continuous process using an electrochemical cell having at least a first electrolyte separated by an anion permeable membrane from an anolyte and by a cation permeable membrane from a catholyte for converting a metal into a metal salt having anions of said first electrolyte which comprises: (a) adding a soluble metal anode to said anolyte; (b) adding a salt to said first electrolyte; (c) adding an electrolyte as said catholyte; (d) passing an electric current through said cell (1) to oxidize and dissolve said metal anode as metal cations in said anolyte; (2) to electrotransport anions of said first electrolyte through said anion permeable membrane into said anolyte; (3) to form a salt of said metal cation and anion of said first electrolyte in said anolyte; (4) to electrotransport cations of said salt of said first electrolyte from said first electrolyte through said cation permeable membrane into said catholyte; (e) controlling the pH of said anolyte at a pH less than the pH at which said metal cation would form a metal hydroxide by at least one of (1) electrolyzing water in said anolyte by increasing the voltage and current density at the anode, (2) adding an insoluble anode to said anolyte and (3) transporting additional hydrogen ions through a cation permeable membrane into said anolyte; and (f) removing said salt of said metal cation and said anion from said anolyte.

2. The process of claim 1 wherein said metal cation is selected from the group of multivalent metals.

3. The process of claim 1 wherein said metal salt is nickel hypophosphite and the pH of the nickel hypophosphite solution is controlled at a value of less than about 3.

4. The process of claim 1 wherein said salt of said first electrolyte is an alkali metal salt having anions selected from acids of phosphorous, sulfur, carbon, nitrogen and halogen.

5. The process of claim 1 wherein said catholyte is an aqueous solution of an alkali hydroxide.

6. A process using an electrochemical cell having at least one metal anode and an anolyte separated by a cation permeable membrane from a salt-forming electrolyte separated by an anion permeable membrane from a first electrolyte separated by a cation permeable membrane from a catholyte for converting a metal to a metal salt having anions electrotransported from said first electrolyte which comprises: (a) adding a metal to said anolyte; (b) adding an electrolyte comprising anions of said first electrolyte as said salt-forming electrolyte; (c) adding a salt to said first electrolyte; (d) adding an electrolyte as said catholyte; (e) passing an electric current through said cell (1) to dissolve said metal anode in said anolyte to form metal cations; (2) to electrotransport said metal cations from said anolyte into said salt-forming electrolyte; (3) to electrotransport anions of said salt of said first electrolyte to said salt-forming electrolyte; (4) to form said metal cations and said anions of said first electrolyte into a salt; (5) to electrotransport cations of said salt of said first electrolyte into said catholyte; (f) controlling the pH of said anolyte and said salt-forming electrolyte at a pH no greater than the pH at which said metal cation forms a hydroxide; (g) controlling the pH of said first electrolyte at a pH no greater than the pH at which said metal cation forms a hydroxide on the salt-forming electrolyte surface of said anion permeable membrane; and (h) removing said metal salt from said cell; wherein the pH of said anolyte and said salt-forming electrolyte is controlled by the addition of hydrogen ions by at least one of (1) electrolyzing water in said anolyte by increasing the voltage and current density at the anode, (2) adding an insoluble anode to said anolyte and (3) transporting additional hydrogen ions through a cation permeable membrane into said anolyte; and wherein the pH of said first electrolyte is controlled by the removal of cations and the addition of hydrogen ions.

7. The process of claim 6 wherein said metal salt is nickel hypophosphite or tin iodide.

8. A process using two electrochemical cells, each having at least an anolyte and a catholyte with anolyte 1 and catholyte 1 of cell 1 separated by an anion permeable membrane and anolyte 2 and catholyte 2 of cell 2 separated by a cation permeable membrane to convert a metal to a metal salt which comprises: (a) adding a metal anode to anolyte 1 comprising a solution of said metal salt; (b) adding a first electrolyte containing a salt as catholyte 1; (c) adding catholyte 1 as anolyte 2 having an insoluble anode; (d) adding an electrolyte as catholyte 2; (e) passing an electric current through cell 1 to (1) dissolve said metal anode to form metal cations in anolyte 1; (2) electrotransport anions of said salt of catholyte 1 to said anolyte 1; (3) form a salt of said metal cations and said anions of catholyte 1; (f) passing an electric current through cell 2 to: (1) remove cations from anolyte 2 and replace said cations with hydrogen ions; (2) form hydroxide ions in catholyte 2 to ionically neutralize said cations removed from anolyte 2; (g) flowing catholyte 1 through cell 2 as anolyte 2 and back to cell 1 as catholyte 1; (h) adjusting flow of electric currents through cell 1 and cell 2 to control the pH of catholyte 1 at a pH no greater than the pH at which said metal cation would form a metal hydroxide on the anolyte side of said anion permeable membrane; (i) controlling the pH of anolyte 1 at a pH no greater than the pH at which said metal cations form a hydroxide.

9. A process using an electrochemical cell having a nickel anode in an anolyte and at least a salt-forming electrolyte, separated from said anolyte by a cation permeable membrane and separated by an anion permeable membrane from a first electrolyte for conversion of metal cations to a metal salt having anions of said first electrolyte which comprises: (a) adding nickel cations from said anolyte to said salt-forming electrolyte; (b) adding sodium hypophosphite to said first electrolyte; (c) passing an electric current through said cell to electrotransport hypophosphite ions of said first electrolyte through said anion permeable membrane into said salt-forming electrolyte; (d) forming a salt of said hypophosphite ions of said first electrolyte and said nickel cations; (e) controlling the pH of said salt-forming electrolyte at a pH less than about 7; (f) controlling the pH of said anolyte at a pH no greater than about 3 by at least one of (1) electrolyzing water in said anolyte by increasing the voltage and current density at the anode, (2) adding an insoluble anode to said anolyte and (3) transporting additional hydrogen ions through a cation permeable membrane into said anolyte; and (g) removing said salt of hypophosphite ions and said nickel cations as said salt-forming electrolyte, said anolyte; and (g) removing said salt of hypophosphite ions and said nickel cations as said salt-forming electrolyte.

* * * * *